US 8,970,952 B2

(12) United States Patent
Fölling et al.

(10) Patent No.: US 8,970,952 B2
(45) Date of Patent: Mar. 3, 2015

(54) SAMPLE HOLDER FOR A MICROSCOPE

(75) Inventors: Jonas Fölling, Heidelberg (DE); Marcus Dyba, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 233 days.

(21) Appl. No.: 13/582,061

(22) PCT Filed: Feb. 25, 2011

(86) PCT No.: PCT/EP2011/052797
§ 371 (c)(1),
(2), (4) Date: Oct. 19, 2012

(87) PCT Pub. No.: WO2011/107401
PCT Pub. Date: Sep. 9, 2011

(65) Prior Publication Data
US 2013/0033744 A1     Feb. 7, 2013

(30) Foreign Application Priority Data
Mar. 1, 2010  (DE) .................. 10 2010 009 679

(51) Int. Cl.
*G02B 21/26*  (2006.01)
(52) U.S. Cl.
CPC .................................... *G02B 21/26* (2013.01)
USPC ............................................ 359/392
(58) Field of Classification Search
USPC ................................ 359/391, 392
See application file for complete search history.

(56) References Cited

U.S. PATENT DOCUMENTS

| 3,851,972 | A | * | 12/1974 | Smith et al. ..................... 356/72 |
| 4,818,169 | A | * | 4/1989 | Schram et al. ............ 414/331.18 |
| 6,043,475 | A | | 3/2000 | Shimada et al. |
| 8,067,245 | B2 | * | 11/2011 | Van Ryper et al. ............ 436/174 |
| 2002/0149845 | A1 | * | 10/2002 | Mayer ............................ 359/391 |
| 2004/0051978 | A1 | | 3/2004 | Withers et al. |
| 2005/0057799 | A1 | * | 3/2005 | Gilbert et al. ................. 359/383 |
| 2006/0050376 | A1 | * | 3/2006 | Houston et al. ............... 359/392 |

(Continued)

FOREIGN PATENT DOCUMENTS

DE          1847180         2/1962
DE      102006021317      10/2007

(Continued)

OTHER PUBLICATIONS

"Sub-diffraction-limit imaging by stochastic optical reconstruction microscopy (STORM)," Nature Methods 3, 793-796 (2006), M. J. Rust, M. Bates, X. Zhuang.

(Continued)

Primary Examiner — Frank Font
(74) Attorney, Agent, or Firm — Hodgson Russ LLP

(57) ABSTRACT

A sample retainer for a microscope is described, comprising a sample stage (32), a holder (34) arranged on the sample stage (32), a sample carrier (36), couplable to the holder (34), to which a sample is attachable, and an adjusting apparatus (44), engaging on the holder (34), with which with the sample carrier (36), together with the holder (34) to which the sample carrier (36) is coupled, is displaceable on the sample stage (32), relative to the objective (46), into a target position. A decoupling apparatus that decouples the sample carrier (36), arranged in the target position, from the holder (34) upon imaging of the sample through the objective (46) is provided.

17 Claims, 6 Drawing Sheets

(56) References Cited

U.S. PATENT DOCUMENTS

2006/0227413 A1* 10/2006 Gilbert ................. 359/368
2009/0134342 A1   5/2009 Hell et al.

FOREIGN PATENT DOCUMENTS

| DE | 112005000017 | 5/2008 |
| DE | 102008024568 | 12/2009 |
| EP | 0248679 | 12/1987 |
| JP | S5953319 | 4/1984 |
| JP | H1138326 | 7/1997 |
| JP | 10039199 | 2/1998 |
| JP | 2003043373 | 2/2003 |
| JP | 2007171722 | 7/2007 |
| JP | 2009198733 | 2/2008 |
| WO | 2006127692 | 11/2006 |
| WO | 2007128434 | 11/2007 |

OTHER PUBLICATIONS

Resolution of Lambda/10 in fluorescence microscopy using fast single molecule photo-switching, Geisler C. et al, Appl. Phys. A, 88, 223-226 (2007).

* cited by examiner

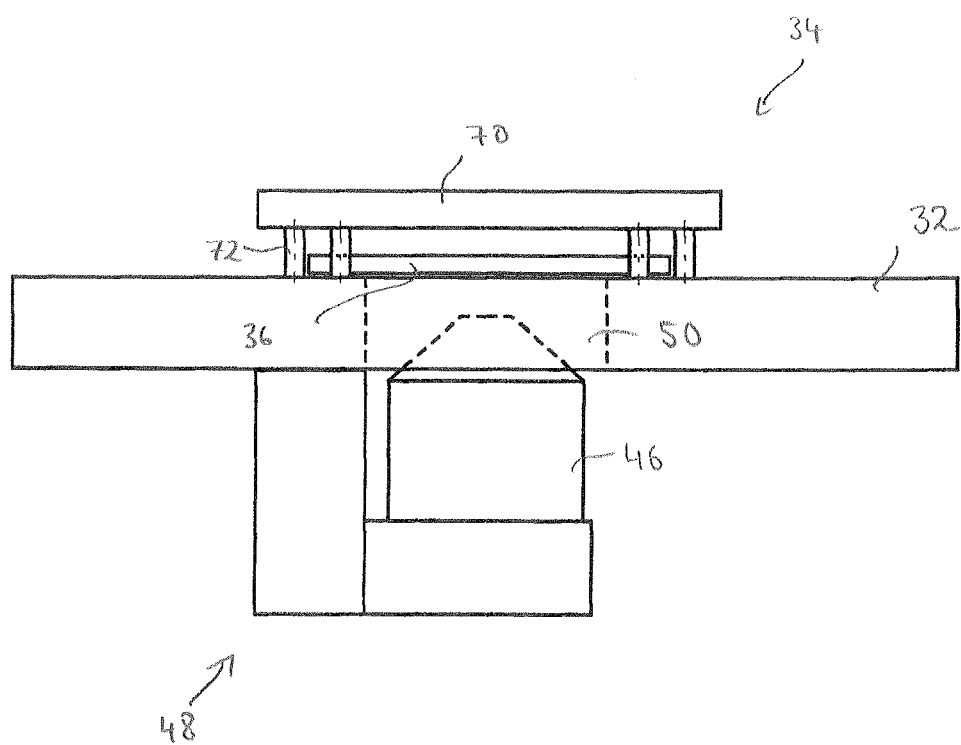

SAMPLE HOLDER FOR A MICROSCOPE

CROSS REFERENCE TO RELATED APPLICATIONS

The present application is the U.S. National Stage of International Application No. PCT/EP2011/052797 filed Feb. 25, 2011, which claims priority of German Application No. 10 2010 009 679.2 filed Mar. 3, 2010. The present application claims priority benefit of International Application No. PCT/EP2011/052797 and German Application No. 10 2010 009 679.2

FIELD OF THE INVENTION

The invention relates to a sample retainer.

BACKGROUND OF THE INVENTION

In the recent past, light-microscopy methods have been developed with which, based on a sequential, stochastic localization of individual point objects (in particular, fluorescence molecules), it is possible to display image structures that are smaller than the diffraction-limited resolution limit of classic light microscopes. Such methods are described, for example, in WO 2006/127692 A2; DE 10 2006 021 317 B3; WO 2007/128434 A1, US 2009/0134342 A1; DE 10 2008 024 568 A1; "Sub-diffraction-limit imaging by stochastic optical reconstruction microscopy (STORM)," Nature Methods 3, 793-796 (2006), M. J. Rust, M. Bates, X. Zhuang; "Resolution of Lambda/10 in fluorescence microscopy using fast single molecule photo-switching," Geisler C. et al, Appl. Phys. A, 88, 223-226 (2007). This new branch of microscopy is also referred to as "localization microscopy." The methods applied are known in the literature, for example, under the designations PALM, FPALM, (F)STORM, PALMIRA, or GSDIM.

The new methods have in common the fact that the structures to be imaged are prepared with markers that possess two different states, namely a "bright" state and a "dark" state. For example, if fluorescent dyes are used as a marker, the bright state is then a fluorescence-capable state and the dark state is a non-fluorescence-capable state. In order for image structures to be imaged at a resolution that is smaller than the classic resolution limit of the imaging optical system, a small subset of the markers is then repeatedly prepared into the bright state. This subset is referred to hereinafter as an "active subset." The active subset must be selected so that the average spacing between adjacent markers in the bright state is greater than the resolution limit of the imaging optical system. The luminance signals of the active subset are imaged onto a spatially resolving light detector, e.g. a CCD camera. A spot of light whose size is determined by the resolution limit of the imaging optical system is therefore acquired from each marker.

The result is that a plurality of individual raw-data images are acquired, in each of which a different active subset is imaged. In an image analysis process, the center points of the spots of light (representing the markers that are in the bright state) are then determined in each individual raw-data image. The center points of the spots of light ascertained from the individual raw-data images are then combined into one overall depiction. The high-resolution image produced by this overall depiction reflects the distribution of the markers. For a representative reproduction of the structure to be imaged, a sufficiently large number of signals must be detected. But because the number of markers in the particular active subset is limited by the minimum average spacing that must exist between two markers in the bright state, a very large number of individual raw-data images must be acquired in order to image the structure completely. The number of individual raw-data images is typically in a range from 10,000 to 100,000.

The time required for acquiring an individual raw-data image is limited at the low end by the maximum image acquisition rate of the imaging detector. This leads to comparatively long total acquisition times for a series of individual raw-data images that is necessary for the overall depiction. The total acquisition time can thus amount to as much as several hours.

Movement of the sample being imaged, relative to the image-producing optical system, can occur over this long total acquisition time. Because all the individual raw-data images must be combined, after center-point determination, in order to create a high-resolution overall image, any relative motion between the sample and the image-producing optical system that occurs during the acquisition of two successive individual raw-data images degrades the spatial resolution of the overall image. In many cases this relative motion derives from a systematic mechanical motion of the system (also referred to as "mechanical drift") that is caused, for example, by thermal expansion or contraction, by mechanical stresses, or by a change in the consistency of lubricants that are used in the mechanical components.

The effects described above will be illustrated below with reference to a conventional inverted light microscope, as depicted in FIG. 1. The microscope according to FIG. 1 has a U-shaped stand 2 to whose limbs a sample retainer 4 is attached. Sample retainer 4 encompasses a sample stage 6 and a holder 8, arranged on sample stage 6, on which a sample carrier (not further depicted in FIG. 1) having a sample is fastened. Located below sample stage 6 is an objective turret 10 having multiple objectives 12 that can be pivoted selectably into an imaging beam path that passes through a through hole 14 embodied in sample stage 6. The imaged sample can be viewed through an eyepiece 16. Also located on stand 2 is a port 18 at which a detector, e.g. a CCD camera, can be connected.

In order to select the sample region to be imaged, holder 8 can be moved, together with the sample carrier fastened to it, laterally (i.e. perpendicularly to the imaging beam path) on sample stage 6. A mechanical adjusting apparatus 20, depicted entirely schematically in FIG. 1, is provided for this. One problem here is that adjusting apparatus 20 is usually not embodied in as drift-stable a manner as is necessary for acquisition of the above-described high-resolution overall image using localization microscopy. If a mechanical drift occurs in adjusting apparatus 20, it is transferred to holder 8, which ultimately results in a lateral relative motion between the sample and objective 12 arranged in the imaging beam path, and thus in drifting of the individual raw-data images assembled into the overall image.

This kind of image drift in the individual raw-data images is also caused by the attachment of objective turret 10 to the U-shaped stand 2. As a result of this conventional arrangement, for example, the image drift-relevant distance between the imaging objective 12 and the sample arranged on holder 8 is comparatively large, since the sample is coupled to objective 12 via sample holder 8, sample stage 6, the U-shaped stand 2, and objective turret 10. Because of this comparatively long distance, the microscope according to FIG. 1 is susceptible to thermal instabilities and mechanical stresses that "add up" over the distance. The comparatively complex mechanism of objective turret 10 is also susceptible to drift.

Reference is further made to US 2004/0051978 A1, DE 11 2005 000 017 B4, and DE 1 847 180 U regarding the existing art.

SUMMARY OF THE INVENTION

The object of the invention is to describe a sample holder for a microscope that is sufficiently drift-stable even in long-term operation.

The sample retainer described herein provides a decoupling apparatus that decouples the sample carrier, arranged in the target position upon imaging of the sample through the objective, from the holder. This decoupling of the holder and sample carrier prevents mechanical drift that occurs, upon imaging of the sample, in the adjusting apparatus engaging on the holder, from being transferred to the sample carrier and therefore to the sample itself. According to the present invention the sample carrier is thus "free" upon imaging of the sample, i.e. it remains unaffected by the drift-susceptible adjusting apparatus which serves to displace the sample carrier, together with the holder, into a target position in order to image the sample through the objective.

The sample retainer according to the present invention is accordingly advantageously usable in particular in localization microscope as recited earlier, which of course is particularly susceptible to mechanical drifting. It is nevertheless self-evident that the sample retainer according to the present invention is also suitable for other applications in which it is important to minimize the influence on sample imaging quality of mechanical drift occurring in the sample retainer.

The decoupling apparatus preferably encompasses at least one holding element, which is part of the holder and engages on the sample carrier upon displacement of the holder, and is disconnected from the sample carrier upon imaging of the sample through the objective. With this embodiment the decoupling apparatus is, as it were, integrated in the form of the holding element into the holder. The holding element has two functions here: on the one hand to position the sample carrier in positionally stable fashion on the holder upon displacement of the holder, and on the other hand to decouple the sample carrier and the holder from one another upon imaging of the sample.

The holding element is, for example, an arm abutting laterally against the sample carrier and pivotable parallel to the sample stage. Alternatively, the holding element can also be a pin abutting laterally against the sample carrier and shiftable perpendicular to the sample stage. In the latter configuration, the holder preferably encompasses a frame, arranged above the sample carrier, on which the pin or pins is/are shiftably mounted.

The adjusting apparatus preferably moves the holder, upon imaging of the sample through the objective, away from the decoupled sample carrier arranged in the target position. This allows the transfer of mechanical drift from the adjusting apparatus via the holder to the sample carrier to be avoided even more reliably.

The alternative approach according to claim 7 provides a pressure apparatus that, upon imaging of the sample through the objective, presses the sample carrier, coupled to the holder and arranged in the target position, against the sample stage. The pressure force exerted by the pressure apparatus on the sample carrier is to be dimensioned so that it holds the sample carrier in positionally stable fashion in the target position even if drift forces act via the holder on the sample carrier as a consequence of a mechanical drift occurring in the adjusting apparatus.

In a preferred embodiment, the pressure apparatus encompasses at least two elements interacting magnetically with one another, of which one is arranged on the sample holder and the other on the sample stage. For example, one of the elements is ferromagnetic while the other is a permanent magnet or electromagnet. Other configurations are, however, also conceivable, for example a pressure apparatus that presses the sample carrier onto the sample stage with a spring or a clamp.

The sample retainer comprises an objective holder, attached to the sample stage, to which the objective is attachable. An objective holder of this kind makes it possible to keep the image drift-relevant distance between the objective and sample as short as possible, so that thermal instabilities and mechanical stresses occurring over that distance have less of an effect in terms of drift than is the case with a conventional arrangement as shown, for example, in FIG. 1.

The objective holder is preferably part of a positioning apparatus which serves to focus the objective onto the sample. The positioning apparatus can form, for example, a substantially L-shaped arrangement that encompasses a first limb attached to the sample stage and arranged parallel to the optical axis of the objective, and a second limb, mounted shiftably on the first limb, to which the objective is attached. The L-shaped embodiment of the positioning apparatus makes it possible to bring the first limb of the arrangement as close as possible to the optical axis of the objective, and thereby to minimize the image drift-relevant distance between the objective and sample.

In a further advantageous embodiment, a guidance apparatus is provided, with which the objective holder is guided movably on the sample stage and is thus removable from a working region in which the objective holder holds the objective in an imaging beam path. This makes it possible to provide in the microscope, in addition to the objective holder according to the present invention, an objective turret that is moved as necessary into the working region when the objective holder is removed from the latter. "Working region" means in this connection that region, usually located below the sample stage, through which the imaging beam path passes and in which the objective is focused onto the sample. This configuration thus offers the capability of working selectably with a conventional objective turret or, if the requirements in terms of image accuracy are particularly stringent, with the objective holder according to the present invention.

The guidance apparatus preferably has a guidance groove embodied on the underside of the sample stage, and a carriage, guided in said groove, that is coupled to the first limb of the positioning apparatus. The positioning apparatus can thus be particularly easily removed from the working region along the sample stage. In a particularly simple embodiment, the carriage is embodied integrally with the first limb of the positioning apparatus.

An elongated recess, in which the objective is movable upon removal of the objective holder from the working region, is preferably embodied on the underside of the sample stage. This configuration is provided for the case in which the objective is located inside a through hole, passing through the sample stage, over which the sample carrier is placed. In this case it is not necessary firstly to move the objective out of said through hole in order to remove the objective holder from the working region. The objective can instead simply be moved in the recess transversely to the imaging beam path. This makes possible a particularly compact construction.

In an alternative embodiment, the positioning apparatus forms an arrangement, rotationally symmetrical around the optical axis of the objective, that encompasses an annular part which is attached to the sample stage and whose center axis coincides with the optical axis of the objective, and a circular plate, arranged shiftably on the annular part, to which the objective is centeredly attached. This rotationally symmetrical construction reduces disadvantageous influences that are caused by drifting of the mechanical components transversely to the imaging beam path.

The positioning apparatus is preferably a piezoelectrically driven apparatus. As such, it has a priori comparatively little susceptibility to drift.

In a further advantageous embodiment, a shield surrounding the arrangement made up of the objective holder and objective is provided, for example for protection from drafts. A shield of this kind can also be provided for the sample itself, so as to protect it, too, from drafts.

According to a further aspect of the invention, a microscope in particular for use in localization microscopy, which is equipped with the sample retainer described above, is provided.

DESCRIPTION OF THE DRAWINGS

The invention will be described below on the basis of exemplifying embodiments with reference to the Figures, in which:

FIG. 9 is a side view of a sample holder according to the present invention according to a fourth exemplifying embodiment;

DETAILED DESCRIPTION OF THE INVENTION

Figure 2:
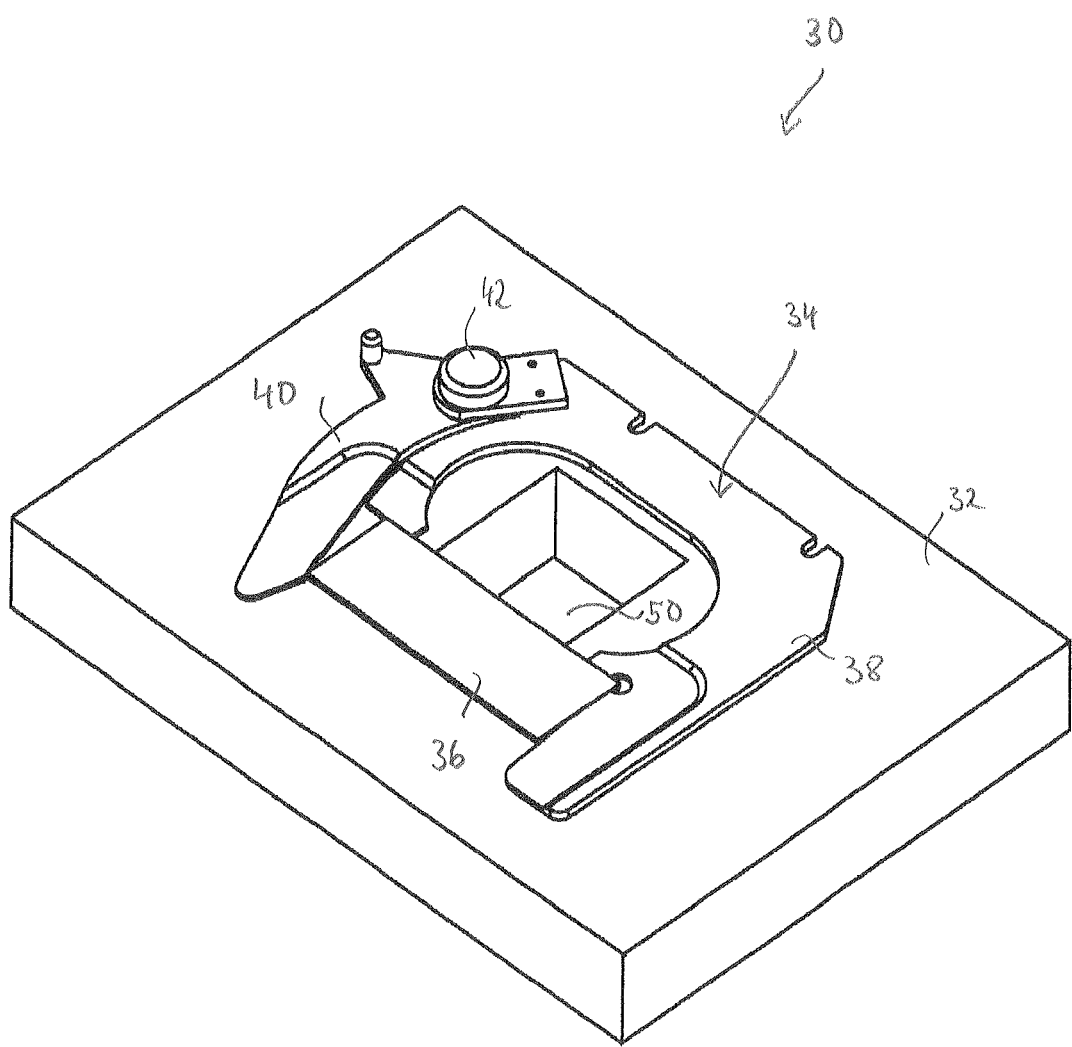
FIG. 2 is a perspective view of a sample retainer according to the present invention according to a first exemplifying embodiment.
Figure 3:
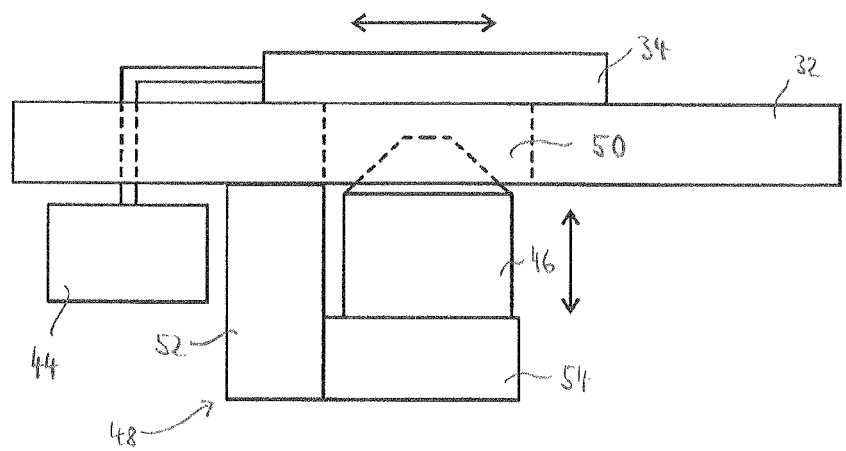
FIG. 3 is a side view of the sample retainer according to the first exemplifying embodiment.
Figure 4:
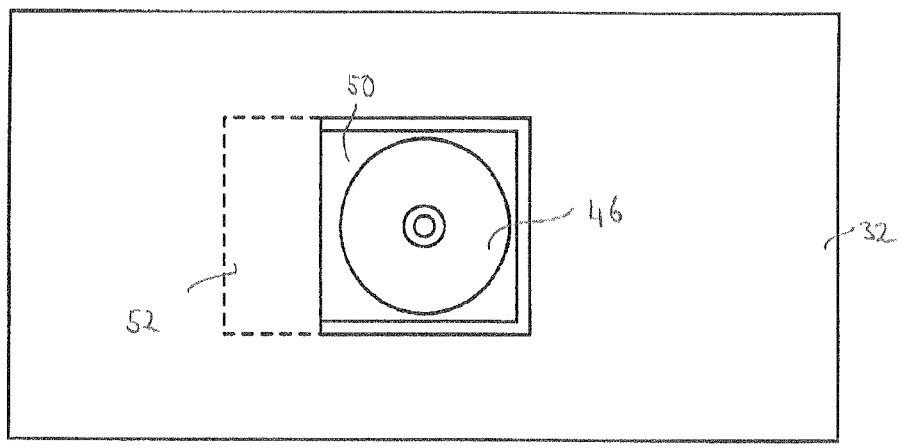
FIG. 4 is a plan view of the sample retainer according to the first exemplifying embodiment.

FIGS. 2 to 4 each show parts of a sample retainer intended for a microscope, according to a first exemplifying embodiment.

As depicted in FIG. 2, the sample retainer encompasses a sample stage 32 and a holder 34 mounted laterally movably on the sample stage. Holder 34 serves to immobilize a sample carrier 36 on which a sample (not shown) can be arranged.

Holder 34 comprises an approximately U-shaped frame 38 on which sample carrier 36 rests. An arm 40 is mounted on frame 38 pivotably around an axis 42. When arm 40 is resting with its free end on sample carrier 36, it presses the latter against that part of frame 38 which is located opposite it, with the result that sample carrier 36 is clamped in place on holder 34.

An adjusting apparatus 44 (depicted purely schematically in FIG. 3) is provided for moving holder 34 laterally on sample stage 32. Holder 34 is also depicted in simplified fashion (without sample carrier 36 and pivot arm 40) in FIG. 3. Adjusting apparatus 44 engages on holder 34, in particular on its frame 38, in order to move holder 34 into a target position in which the sample arranged on sample carrier 36 is arranged as desired in an imaging beam path that is defined by the optical axis of an objective 46 (see FIG. 3). Objective 46 is held on a positioning apparatus 48, L-shaped in the side view shown in FIG. 3, which serves to focus objective 46 onto the sample. Objective 46 projects, with its end facing toward the sample, into a through hole 50 that passes through sample stage 32.

Positioning apparatus 48 comprises a first limb 52 that is attached to sample stage 32 and is arranged parallel to the optical axis of objective 46, and a second limb 54, mounted shiftably on first limb 52, to which objective 46 is attached and which is located perpendicular to the optical axis of objective 46. Second limb 54 can be moved, via a piezoelectric drive (not shown), along first limb 52 in order to focus objective 46 onto the sample.

In order to establish the region of the sample to be imaged, adjusting apparatus 44 moves holder 34 together with sample carrier 36 fastened to it, under the control of a precision control system (not shown), into a desired target position. In this context, arm 40 presses sample carrier 36 against frame 38, with the result that sample carrier 36 is positioned fixedly in holder 34. Once the desired target position has been reached, arm 40 is pivoted laterally (to the left in FIG. 2) around axis 42 parallel to sample stage 32, so that it detaches from sample carrier 36. Adjusting apparatus 44 then moves holder 34 slightly away from sample carrier 36 so that sample carrier 36 is no longer resting on frame 38 of holder 34. In this state, sample carrier 36 is thus lying freely on sample stage 32 (over passthrough hole 50). It is thereby possible to reliably avoid the transfer, via holder 34 onto sample carrier 36, of any mechanical drifting motion that occurs in the mechanical components of the adjusting apparatus engaging on holder 34. Imaging of the sample in a manner largely uninfluenced by mechanical drift is thus possible.

In this exemplifying embodiment arm 40 thus constitutes both a part of holder 34 and a decoupling apparatus which serves to decouple sample carrier 36 from holder 34 as soon as sample carrier 36 has reached its target position in which the sample is to be imaged.

Figure 1:
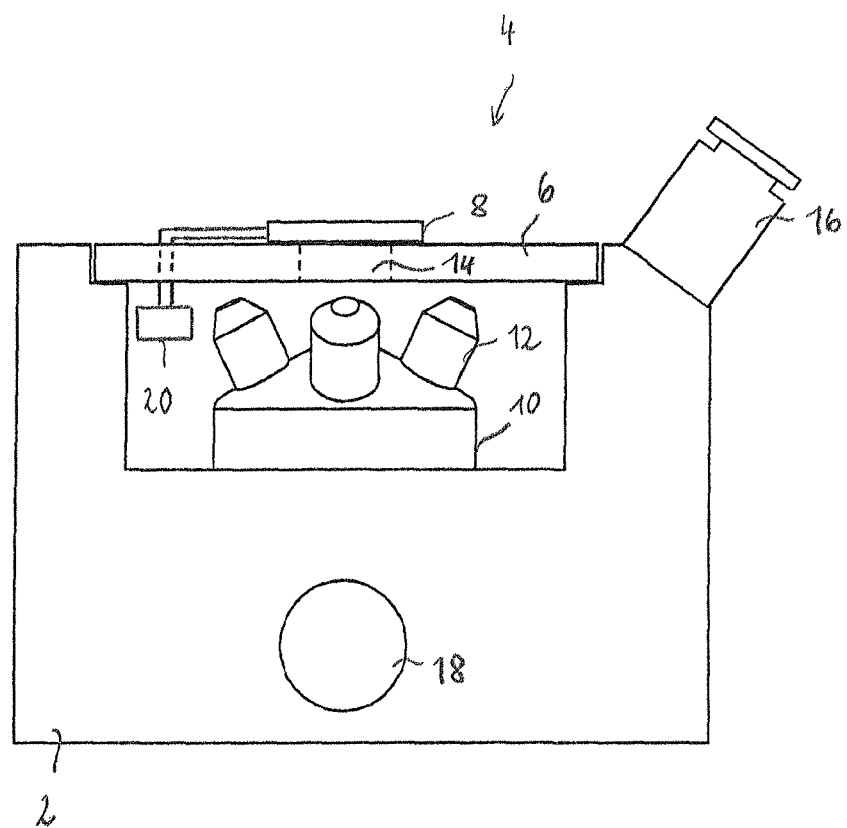
FIG. 1 shows a conventional inverted microscope.

Such is also promoted by the attachment of objective 46 to the L-shaped positioning apparatus 48, as is evident from FIGS. 3 and 4. The image drift-relevant distance between objective 46 and the sample to be imaged is thus shorter, as a result of the L-shaped attachment of objective 46 to sample stage 32, than in the conventional configuration depicted in FIG. 1, in which this distance is defined substantially by the U-shaped stand 2. It is evident in particular from the plan view in FIG. 4 that first limb 52 of positioning apparatus 48, attached to sample stage 32, can be arranged comparatively close to the optical axis of objective 46, so that the arrangement constituted from objective 46 and positioning apparatus 48 has a comparatively compact configuration.

Figure 5:
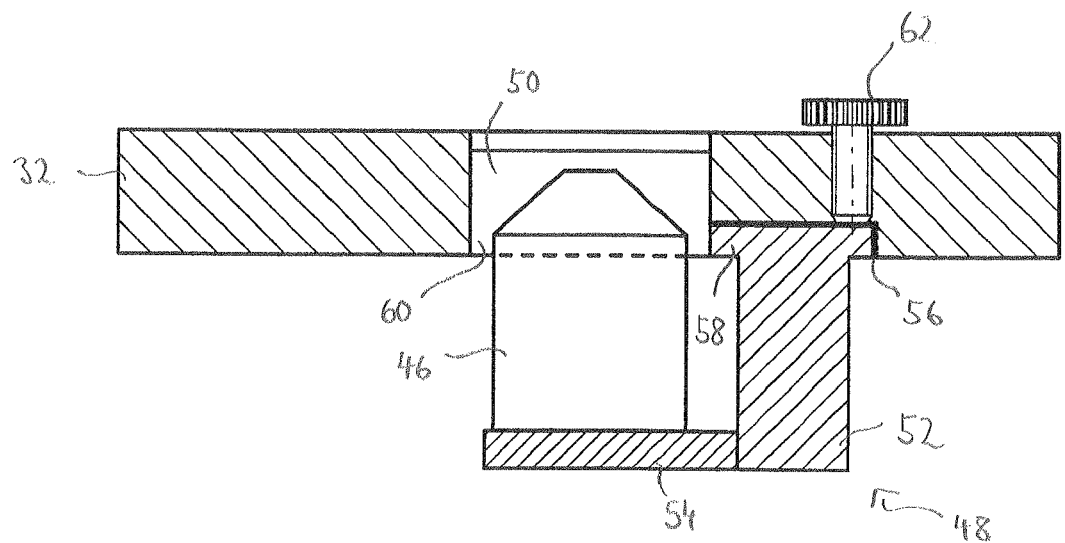
FIG. 5 is a side view of a sample holder according to the present invention according to a second exemplifying embodiment.
Figure 6:
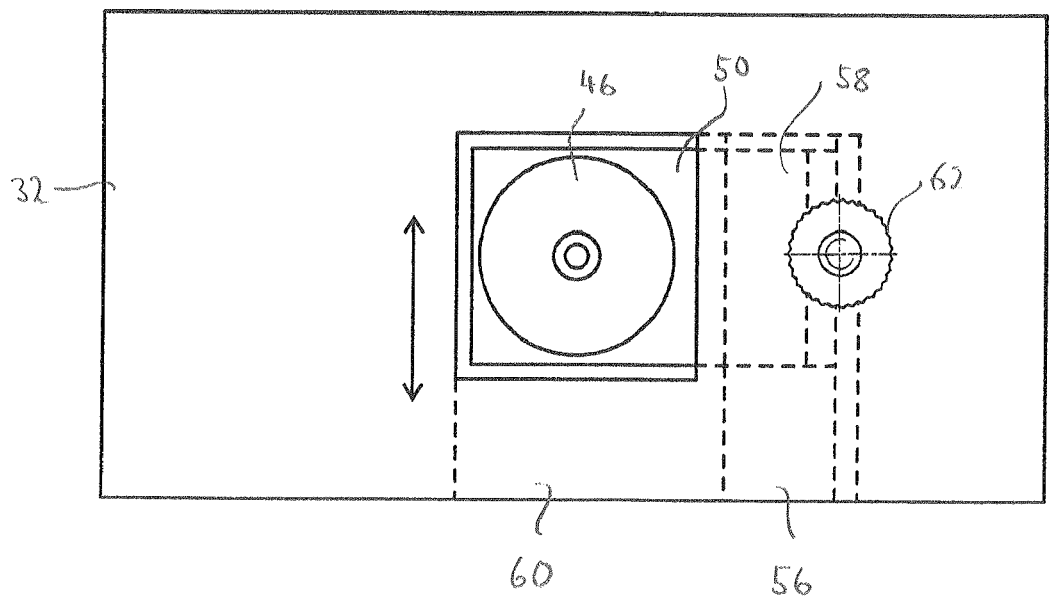
FIG. 6 is a plan view of the sample holder according to the second exemplifying embodiment.

FIGS. 5 and 6 depict, as a second exemplifying embodiment, an embodiment modified as compared with FIGS. 3 and 4. FIG. 5 shows a side view, and FIG. 6 a plan view. In this modified embodiment, positioning apparatus 48 is attached displaceably to sample stage 32. For this, sample stage 32 comprises on its underside a guidance groove 56 in which a carriage 58 is displaceably guided. In this embodiment, carriage 58 is embodied integrally with that end of first limb 52 which faces toward the sample. In addition, an elongated recess 60 that adjoins the through hole 50 which passes through sample stage 32 is embodied on the underside of sample stage 32.

In order to remove positioning apparatus 48, together with objective 46 held on it, from the working region in which the end of objective 46 facing toward the sample is arranged inside through hole 50, carriage 58 is moved in guidance groove 56 along sample 32 (downward in FIG. 6). In that context, the end of objective 46 facing toward the sample moves in elongated recess 60. It is therefore not necessary, before the shifting of positioning apparatus 48, firstly to shift objective 46 sufficiently along the imaging beam path (downward in FIG. 5) until the end facing toward the sample has moved completely out of through hole 50.

In order to immobilize positioning apparatus 48 in the working region, a fastening screw 62 that is screwed from above into sample stage 32 is provided in order to secure carriage 58 in guidance groove 56.

Figure 8:
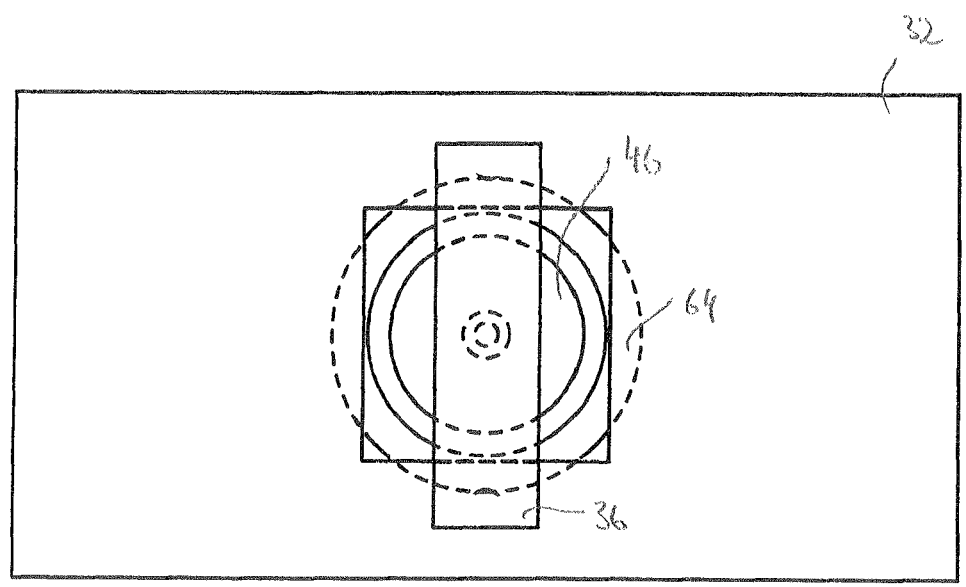
FIG. 8 is a plan view of the sample holder according to the third exemplifying embodiment.
Figure 7:
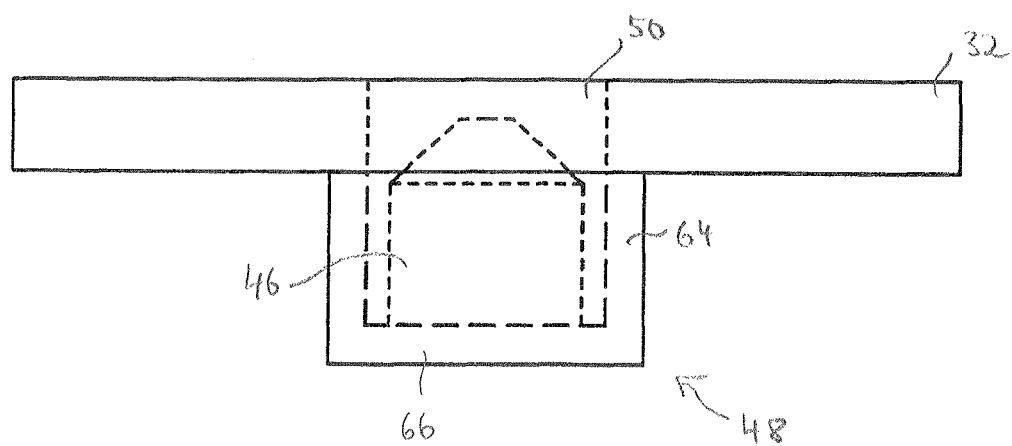
FIG. 7 is a side view of a sample holder according to the present invention according to a third exemplifying embodiment.

FIGS. 7 and 8 show a further modification as a third exemplifying embodiment. FIG. 7 shows a side view, and FIG. 8 a plan view. As may best be gathered from the side view according to FIG. 7, positioning apparatus 48 in this embodiment comprises an annular part 64 attached to sample stage 32, and a circular plate 66 arranged shiftably on annular part 64. Objective 46 is attached centeredly to plate 66. The center axis of annular part 64 coincides with the optical axis of objective 46. The arrangement constituted from objective 46 and positioning apparatus 48 is thus rotationally symmetrical around the optical axis of objective 46. This arrangement ensures that drift motions of the mechanical components of the arrangement transversely to the optical axis, which are caused e.g. by thermal effects or mechanical stresses, are largely annulled.

The side view in FIG. 9 depicts a further modified embodiment as a fourth exemplifying embodiment. This embodiment differs from the exemplifying embodiment shown in FIG. 2 by having a different configuration of holder 34. Holder 34 according to FIG. 9 thus comprises a frame 70, arranged at a vertical spacing from the upper side of sample stage 32, on which multiple vertically displaceable pins 72 are mounted. Pins 72 abut laterally against sample carrier 36, with the result that sample carrier 36 is immobilized on holder 34. In order to decouple holder 34 from sample carrier 36, pins 72 are displaced upward in FIG. 9 so that they no longer abut against sample carrier 36. Once pins 72 have been shifted, sample carrier 36 is entirely free. Additional movement of holder 34, as in the embodiment shown in FIG. 2, is not necessary here.

Figure 10:
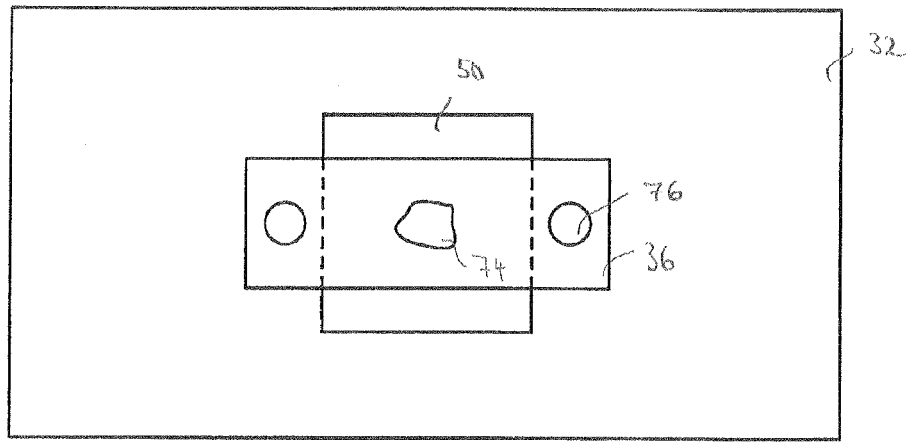
FIG. 10 is a plan view of the sample holder according to a fifth exemplifying embodiment.

The plan view according to FIG. 10 depicts a modified embodiment as a fifth exemplifying embodiment. Whereas in the exemplifying embodiments shown in FIGS. 2 to 9 the sample carrier 36 is decoupled from holder 36 upon imaging of the sample (labeled 74 in FIG. 10), the embodiment according to FIG. 10 provides for a pressure apparatus that presses sample carrier 36 against sample stage 32 upon imaging of sample 74. In this exemplifying embodiment, the pressure apparatus is constituted by two permanent magnets 76 arranged on sample carrier 36, and by two ferromagnetic regions that are arranged on sample stage 32 and are associated with permanent magnets 76. The magnetic interaction between permanent magnets 76 and the respective ferromagnetic regions associated with them ensures that sample carrier 36 is pressed sufficiently strongly onto sample stage 32 to avoid the transfer, via holder 34 onto sample carrier 36, of a mechanical drift occurring in adjusting apparatus 44. To ensure this, permanent magnets 76 are arranged on sample carrier 36, and the ferromagnetic regions associated with them are arranged on sample stage 32, in such a way that the intended magnetic interaction for image drift-avoiding securing of sample carrier 36 in its target position is possible.

Permanent magnets 76 can also be arranged on sample stage 32, and the ferromagnetic regions on sample carrier 36. Permanent magnets 76 can also be replaced by electromagnets. The latter can be switched on and off in defined fashion by way of the precision control system (not shown) in order to achieve the desired effect. It is thus conceivable, for example, to leave the electromagnets switched off at first so that sample carrier 36 held on holder 34 can more easily be moved on sample stage 32. Only once the target position has been reached are the electromagnets then switched on in order to press sample carrier 36 against sample stage 32.

FIGS. 2 through 10 explained above each depict only those components of the sample retainer that are necessary for an understanding of the respective set of facts being illustrated. In the plan view according to FIG. 10, for example, various components of the sample retainer are omitted in order to simplify the depiction, in particular holder 34, adjusting apparatus 44, and objective 46. A holder of the kind shown in FIG. 2 can be used, for example, in the embodiment according to FIG. 10; instead of the pivotable arm 40, a stationary holder component, for example an additional part of frame 38, can be provided.

It must also be pointed out that the different embodiments depicted in FIGS. 3 to 10 can usefully be combined with one another. For example, both the embodiments shown in FIGS. 2 and 8 that are directed toward decoupling of sample carrier 36, and the embodiment shown in FIG. 10 that is directed toward securing sample carrier 36, are each of themselves combinable with the embodiments according to FIGS. 3 to 8.

Because of the compact configuration of positioning apparatus 48, it is further possible to protect it, together with objective 46 held on it, from drafts by way of a shield (not shown in the Figures) that can be attached, for example, to sample stage 32.

PARTS LIST

2 Stand
4 Sample retainer
6 Sample stage
8 Holder
Objective turret
12 Objectives
14 Through hole
16 Eyepiece
18 Port
20 Adjusting apparatus
32 Sample stage
34 Holder
36 Sample carrier
38 Frame
40 Arm
42 Axis
44 Adjusting apparatus
46 Objective
48 Positioning apparatus
50 Through hole
52 First limb
54 Second limb
56 Guidance groove
58 Carriage
60 Elongated recess
62 Fastening screw 64 Annular part
66 Plate
70 Frame
72 Pin
74 Sample
76 Permanent magnets

The invention claimed is:

1. A sample retainer for a microscope, comprising:
a sample stage (32);
a holder (34) arranged on the sample stage (32);
a sample carrier (36), couplable to the holder (34), to which a sample is attachable;
an objective holder (54), attached to the sample stage (32), on which an objective (46) is held;
an adjusting apparatus (44), configured to engage the holder (34) when the sample carrier (36) and the holder (34) are coupled together, such that the holder (34) and the sample carrier (36) are displaceable on the sample stage (32), relative to the objective (46), into a target position; and
a decoupling apparatus that decouples the sample carrier (36), arranged in the target position, from the holder (34) for imaging of the sample by the objective (46).

2. The sample retainer according to claim 1, wherein the decoupling apparatus includes at least one holding element (40, 72), which is part of the holder (34) and engages the sample carrier (36) upon displacement of the holder (34), the at least one holding element (40,72) being disconnected from the sample carrier (36) for imaging of the sample by the objective (46).

3. The sample retainer according to claim 2, wherein the holding element is an arm (40) abutting laterally against the sample carrier (36) and pivotable parallel to the sample stage (32).

4. The sample retainer according to claim 2, wherein the holding element is a pin (72) abutting laterally against the sample carrier (36) and shiftable perpendicular to the sample stage (32).

5. The sample retainer according to claim 4, wherein the holder (34) includes a frame (70), arranged above the sample carrier (36), on which the pin (72) is shiftably mounted.

6. The sample retainer according to claim 2, wherein the adjusting apparatus (44) moves the holder (34) away from the decoupled sample carrier (36) arranged in the target position.

7. A sample retainer for a microscope, comprising:
a sample stage (32);
a holder (34) arranged on the sample stage (32);
a sample carrier (36), couplable to the holder (34), to which a sample is attachable;
an objective holder (54), attached to the sample stage (32), to which an objective (46) is held;
an adjusting apparatus (44), configured to engage the holder (34) when the sample carrier (36) and the holder (34) are coupled together, such that the holder (34) and the sample carrier (36) are displaceable on the sample stage (32), relative to the objective (46), into a target position; and
a pressure apparatus for imaging of the sample by the objective (46), the pressure apparatus configured to press the sample carrier (36) against the sample stage (32) when the sample carrier is coupled to the holder (34) and arranged in the target position.

8. The sample retainer according to claim 7, wherein the pressure apparatus includes at least two elements (76) interacting magnetically with one another, wherein a first of the at least two elements (76) is arranged on the sample holder (36) and a second of the at least two elements (76) is arranged on the sample stage (32).

9. The sample retainer according to claim 7, wherein the objective holder (54) is part of a positioning apparatus (48) which focuses the objective (46) on the sample.

10. The sample retainer according to claim 7, further comprising a guidance apparatus (56, 58) with which the objective holder (54) is movably guided on the sample stage (32) such that the objective holder (54) is removable from a working region in which the objective holder (54) holds the objective (46) in an imaging beam path.

11. The sample retainer according to claim 9, wherein the positioning apparatus (48) forms a substantially L-shaped arrangement that includes a first limb (52) attached to the sample stage (32) and arranged parallel to an optical axis of the objective (46), and a second limb (54), mounted shiftably on the first limb (52), to which the objective (46) is attached.

12. The sample retainer according to claim 10, wherein the guidance apparatus includes a guidance groove (56) on the underside of the sample stage (32), and a carriage (58), guided in said groove, that is coupled to the first limb (52) of the positioning apparatus (48).

13. The sample retainer according to claim 12, wherein the underside of the sample stage (32) includes an elongated recess (60) in which the objective (46) is movable upon removal of the objective holder (54) from the working region.

14. The sample retainer according to claim 9, wherein the positioning apparatus (48) forms an arrangement, rotationally symmetrical around an optical axis of the objective (46), that includes an annular part (64) which is attached to the sample stage (32) and whose center axis coincides with the optical axis of the objective (46), and a circular plate (66), arranged shiftably on the annular part (64), to which the objective (46) is centeredly attached.

15. The sample retainer according to claim 9, wherein the positioning apparatus (48) is a piezoelectrically driven apparatus.

16. The sample retainer according to claim 14, further comprising a shield surrounding the arrangement made up of the objective holder (54) and objective (46).

17. A microscope, comprising:
a sample retainer including:
a sample stage (32);
a holder (34) arranged on the sample stage (32);
a sample carrier (36), couplable to the holder (34), to which a sample is attachable;
an objective holder (54), attached to the sample stage (32), to which an objective (46) is held;
an adjusting apparatus (44), configured to engage the holder (34) when the sample carrier (36) and the holder (34) are coupled together, such that the holder (34) and the sample carrier (36) are displaceable on the sample stage (32), relative to the objective (46), into a target position;
a pressure apparatus for imaging the sample by the objective (46), the pressure apparatus configured to press the sample carrier (36) against the sample stage (32) when the sample carrier is coupled to the holder (34) and arranged in the target position; and
an objective turret that is movable into the working region when the objective holder (54) is removed.

* * * * *